(12) United States Patent
Goernemann

(10) Patent No.: US 7,130,497 B2
(45) Date of Patent: Oct. 31, 2006

(54) OPTICAL POSITION SENSING APPARATUS

(75) Inventor: Otto Goernemann, Kaarst (DE)

(73) Assignee: Sick AG, Waldkirch (DE)

( * ) Notice: Subject to any disclaimer, the term of this patent is extended or adjusted under 35 U.S.C. 154(b) by 131 days.

(21) Appl. No.: 10/927,765

(22) Filed: Aug. 26, 2004

(65) Prior Publication Data
US 2005/0047707 A1    Mar. 3, 2005

(30) Foreign Application Priority Data
Aug. 27, 2003   (DE)   ............... 203 13 230 U

(51) Int. Cl.
*G02B 6/00*   (2006.01)
(52) U.S. Cl. .............. 385/12; 385/13; 385/88; 385/92
(58) Field of Classification Search ............ 385/88–94, 385/12–13; 398/141–145
See application file for complete search history.

(56) References Cited

U.S. PATENT DOCUMENTS 5,572,075 A    11/1996   Campbell et al.

2004/0179784 A1 *   9/2004   Vancoille et al. ............. 385/47

FOREIGN PATENT DOCUMENTS

| DE | 19649583 A1 | 6/1998 |
| DE | 20000868 U1 | 1/2000 |
| DE | 20000868 U1 | 4/2000 |

* cited by examiner

*Primary Examiner*—Kevin S. Wood
(74) *Attorney, Agent, or Firm*—Townsend and Townsend and Crew LLP

(57) ABSTRACT

An optical position detection device is formed by an optical sending and receiving unit, which has a sender with associated transmission optics and a receiver arranged at a given distance or position from the sender with associated reception optics, and an optical lightguide unit. The two units can move relative to each other and are configured so that, when they are at the given distance or position relative to each other, a light beam emitted from the sender of the transmission optics is directed to the reception optics.

15 Claims, 3 Drawing Sheets

OPTICAL POSITION SENSING APPARATUS

BACKGROUND OF THE INVENTION

The invention concerns devices for optically determining the position of objects.

Such devices are known from DE 200 00 868 U1 and used, for example, to detect whether a protective or safety door, provided, for example, to safeguard a hazardous machine or plant, is open or closed. The position detection device is part of a safety mechanism of the type which includes an electrical interlock with the controls for a machine, so that, for example, when the safety door is open, a dangerous condition at the machine can be eliminated or prevented by an appropriate shut-off procedure. The areas of application of the position detection device are described at length in DE 200 00 868 U1, and express reference is made here to the disclosure of DE 200 00 868 U1.

The known position detection device has the drawback that it employs an optical system that is based on the triangulation principle. It requires close tolerances, which increases installation and adjustment costs and may also lead to malfunctions, such as an early shut-off, or a failure to turn off the machine. It would therefore be desirable to have the ability to readily select the tolerances so that they suit the encountered application and safety requirements.

SUMMARY OF THE INVENTION

In view of this state of the art, the present invention provides an optical position detection device that can be designed more application-specific, while avoiding the problems encountered in the past.

Thus, the optical position detection device of the present invention has an optical sending and receiving unit, which comprises a sender with needed transmission optics, a receiver arranged at a predetermined or otherwise definite distance from the sender which has the needed reception optics, and an optical lightguide unit. The optical sending and receiving units can move relative to each other, and they are designed so that, when they are at a given position relative to each other, a light beam emitted by the sender of the transmission optics of the sending and receiving unit is guided to the reception optics of the sending and receiving unit. The transmission optics and the reception optics of the optical sending and receiving unit are arranged so that the axis of the emitted beam lies at an angle of about 90 degrees relative to the axis of the received beam.

A principal advantage of this arrangement of the sender and receiver is that application-specific and safety-promoting tolerances are attained with simple geometrical configurations, such as distances or optical diameters, which was not possible with the triangulation concept employed in the past. A further advantage is that a given position detection device, with its sending and receiving unit and different lightguide units, can be used for applications having different activation distances and tolerances. In this way, a large range of applications requiring differing variables can be provided in a simple and economical way.

Preferably, an infrared transmitter (IR) is used as the sender.

The sender with its transmission optics and the receiver with its reception optics are preferably arranged in a common housing provided with glass windows through which the emitted and the received light beams pass.

In a first embodiment of the invention, the lightguide unit is defined by three mirrors, each one deflecting the light beam by about 90 degrees.

Alternatively, instead of using deflecting mirrors, the lightguide unit can use a flexible optical fiber or fibers, or a lightguide made of a rigid material. Lightguides have the advantage that they improve the electromagnetic compatibility of the position detection device. Such lightguides can also be made relatively cost effectively.

The lightguide unit is preferably arranged in a protective housing that has two glass windows through which the light beam enters and leaves.

In another embodiment of the invention, the position detection device includes control and/or evaluation electronics ("evaluation unit") associated with the receiver of the sending and receiving unit. The position detection device can then function as a switch, e.g. a position and/or safety switch. In a preferred embodiment, the sending and receiving unit is fixedly mounted to the machine housing and the lightguide unit is attached to a protection mechanism that is movable relative to the machine housing, such as a protective door or the like.

DESCRIPTION OF THE PREFERRED EMBODIMENTS

Figure 1:
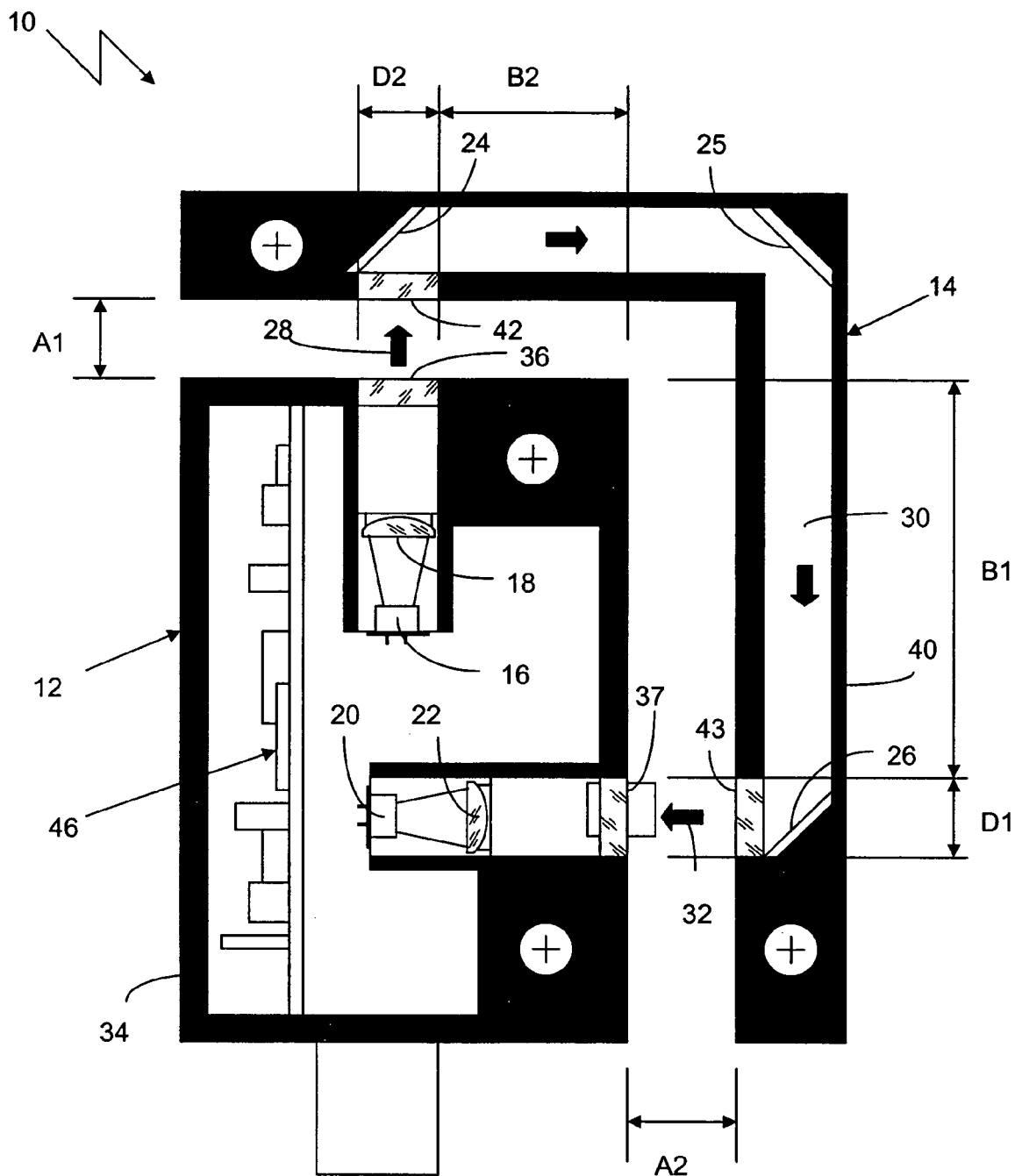
FIG. 1 is a schematic representation of a first embodiment of the optical position detection device of the present invention, which has a sending and receiving unit that is part of a safety switch attached to a machine housing and a lightguide unit attached to a protective door.

FIG. 1 schematically shows a first embodiment of an optical position detection device 10 with an optical sending and receiving unit 12 and an optical lightguide unit 14. The sending and receiving unit 12 comprises a sender or emitter 16 with associated transmission optics 18 and a receiver or deflector 20 with associated reception optics 22 arranged at a defined distance "A" from sender 16.

In the embodiment shown in FIG. 1, the lightguide unit 14 has first, second and third mirrors 24, 25 and 26, respectively, which direct the light beam on a defined path through the lightguide unit.

The sending/receiving unit 12 and the lightguide unit 14 can move relative to each other and are constructed so that, when they occupy the defined position relative to each other as shown in FIG. 1, a beam of parallel light 28 emitted by sender 16 of transmission optics 18 of the sending and receiving unit 12 strikes a first mirror 24 of lightguide unit 14, while maintaining at least a minimum cross-section of the light beam. Mirror 24 deflects the beam to a second mirror 25 of the lightguide unit 14 which in turn deflects it to a third mirror 26 that directs the beam onto the reception optics 22 of the sending and receiving unit 12. An IR sender can be used for generating the light beam.

Transmission optics 18 and reception optics 22 are arranged so that the axes of the beam leaving and reentering the sending and receiving unit 12 are inclined relative to each other by an angle of about 90 degrees. This means, as is shown in FIG. 1, that the light beam is initially emitted upwardly and returns to sending and receiving unit 12, as a received or returned beam, from the side (here, the right side) at an angle of about 90 degrees to the former. In the lightguide unit 14, the light beam is deflected three times by 90 degrees, for a total of 270 degrees.

As is shown in FIG. 1, sender 16 with associated transmission optics 18 and receiver 20 with associated reception optics 22 are arranged in a common housing 34. Housing 34 has front glass windows 36 and 37 through which the emitted light beam 28 and the received light beam 32 pass. Windows 36 and 37 are located on adjacent sides of the sending and receiving unit 12, perpendicular to each other. An electronic evaluation unit 46 is arranged in housing 34 and is associated with receiver 20. Alternatively, emitter 16 can also be connected to such an evaluation unit. In the preferred embodiment, the sending and receiving unit 12 is part of a position and/or safety switch. The sending and receiving unit 12 is attached to a machine housing and lightguide unit 14 is suitably connected to a protective mechanism that can move relative to the machine housing, for example a protective door.

The three mirrors 24, 25, 26 of lightguide unit 14 are placed in a common housing 40. Housing 40 also has front windows 42 and 43. Emitted light beam 28 passes through window 42 before it strikes the first mirror 24, and received light beam 32 deflected by third mirror 26 passes through window 43. Inside housing 40, the light beam 28 travels along a light deflection channel 30 that forms part of lightguide unit 14.

By suitable choice of the geometrical dimensions, such as the distances "A1" and "A2" of the front windows 36 and 37 of sending and receiving unit 12 from the front windows 42 and 43 of lightguide unit 14;

the optical diameter of emitted light beam "D2";

the optical diameter of received light beam "D1";

the distance "B2" of the emitted light beam from the side of housing 34 with front window 37 for the received light beam, and the distance "B1" of the received light beam from the side of the housing 34 with the front window 36 for the emitted light beam, tolerances can be set that are suitable for the encountered application and safety requirements.

If the two units 12, 14 are in their normal relative operating positions as shown in FIG. 1, where front windows 36 and 42 ands 37 and 43, respectively, face each other, for which defined distances "A1" and "A2" exist, the parallel light beam 28 emitted by the sender optics 18 will arrive at the reception optics 22 while substantially maintaining at least a minimum cross-section in the form of a received beam 32 of parallel light. Thus, the system has an active part, comprising the sending and receiving unit 12 attached to the machine housing, and a passive part, comprising the lightguide unit 14 which is mounted on the protective door. The light emitted by sender 16, preferably IR light, emerges through window 36, passes through window 42 of the lightguide unit 14, and is reflected by first mirror 24 onto the second mirror 25. The second mirror reflects the light further onto the third mirror 26, which deflects the beam by 90 degrees. The light beam then passes through front window 43 of lightguide unit 14 and through front window 37 of sending and receiving unit 12 after which the beam strikes receiver 20. Depending on the particular safety considerations, the evaluation of reception signals generated by the receiver, as well as the generation of corresponding switching commands, can be done, for example, by control and/or evaluation unit 46 in housing 34. However, an evaluation of the reception signals is also possible in an evaluation unit that is outside, that is, separate of the switch, although an integrated evaluation unit is preferred.

Figure 2:
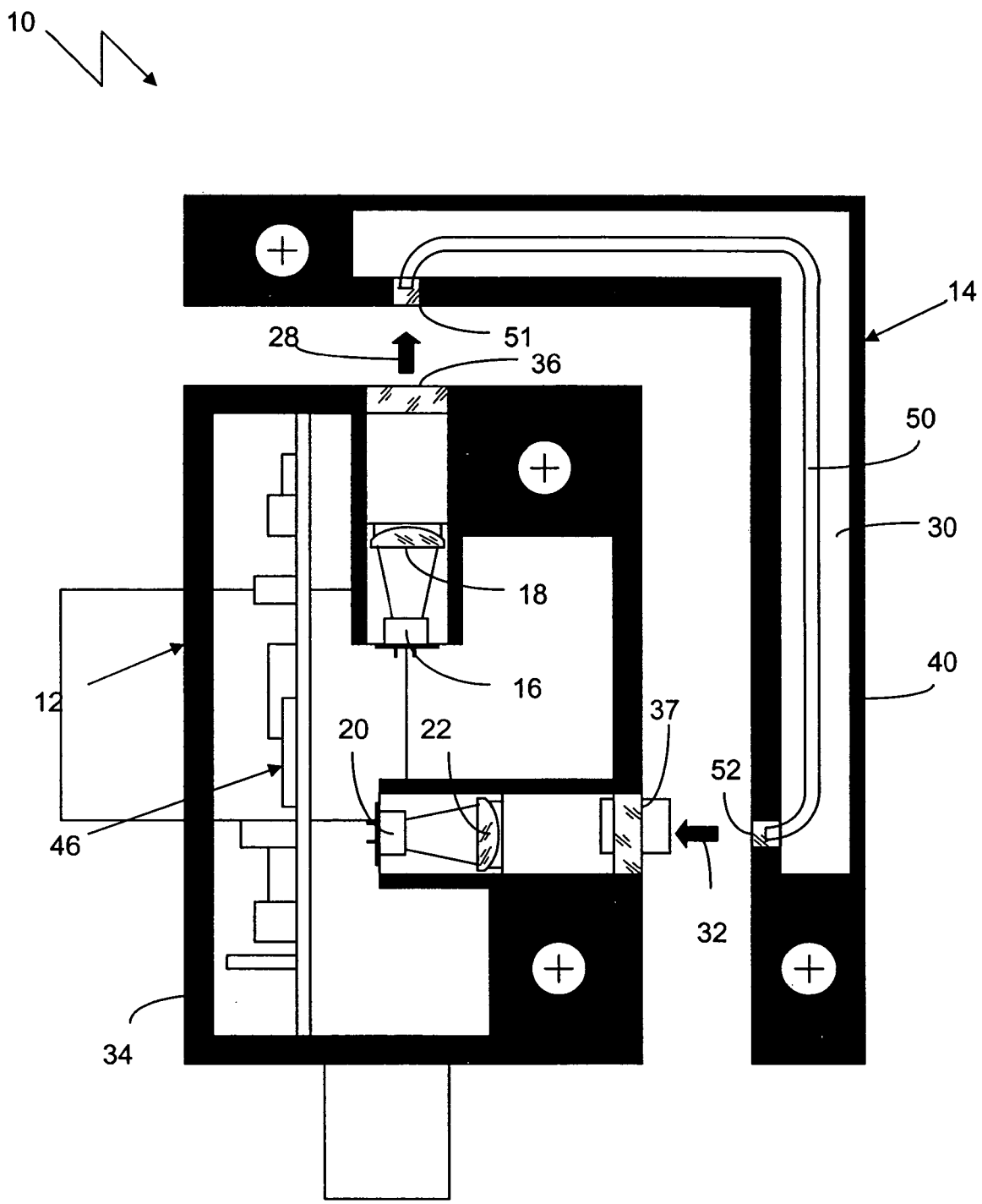
FIGS. 2 and 3 schematically show further embodiments of the optical position detection device.

Referring to FIG. 2, in another embodiment, lightguide unit 14 has a lightguide, configured as a flexible lightguide 50, e.g. made of optical fibers, arranged in a lightguide channel 30, instead of deflection mirrors. In this embodiment, the front windows 42 and 43 of the lightguide unit 14 of the first described embodiment are replaced by end windows 51, 52 or optics for coupling the light into and out of the lightguide.

Figure 3:
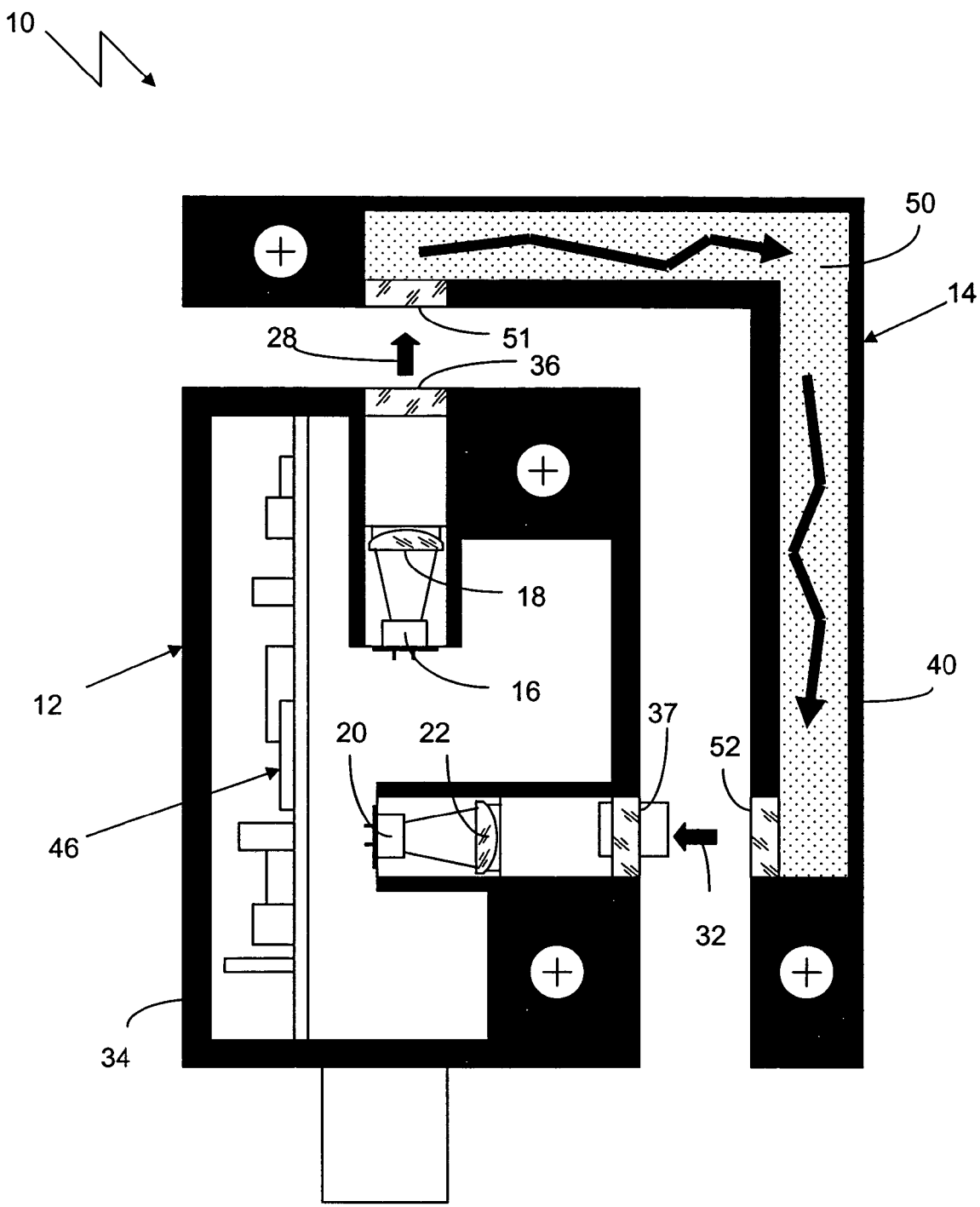

Referring to FIG. 3, in a further embodiment of the invention, the flexible lightguide shown in FIG. 2 is replaced by a lightguide 60 made of a rigid, light-conducting material, in which the light is forwarded, for example, by a secondary emission of colorants contained in the material. In embodiments employing flexible or rigid lightguides, the cross-section and the parallelness of the light beam are not maintained.

The lightguide housings can be made cost effectively as a shaped profile section. Due to the short distances that are involved, the quality of the reflection surfaces can be relatively low. The surfaces of windows 36, 37, 42, and 43 can, for example, be coated with commercially available water and soil repellents to create a so-called lotus leaf effect, thereby improving the availability of the system.

The position detection device of the present invention can also be used, for example, for scanning linear movements. Thus, similar to the already described application for secure position scanning of an axial system, a secure zone scanning of a linear (translatory) movement can be used, for example, in connection with robots, handling systems, crane installations and similar applications and installations.

The invention claimed is:

1. An optical position detection device comprising an optical sending and receiving unit which includes a sender with associated transmission optics for emitting a radiation beam and a receiver arranged at a given distance from the sender and having associated reception optics for receiving the radiation beam, and an optical lightguide unit comprising first, second and third mirrors, each of which deflects the beam by about 90 degrees, for directing the beam from the sender to the receiver, wherein the units can move relative to each other and are configured so that, when they are at the given distance relative to each other, the light beam emitted by the sender is guided to the reception optics, the transmission optics and the reception optics being arranged so that respective axes of the beam emitted by the sender and received by the receiver are angularly inclined with respect to each other by about 90 degrees.

2. An optical position detection device according to claim 1 wherein the sender comprises an infrared radiation source.

3. An optical position detection device according to claim 1 wherein the sender with the associated transmission optics and the receiver with the associated reception optics are arranged in a common housing including a first window through which the beam emitted by the sender passes and a second window through which the beam passes before it strikes the receiver.

4. An optical position detection device according to claim 1 wherein the first, second and third mirrors are arranged in a common housing which includes windows through which the beam passes before it leaves and enters the common housing.

5. An optical position detection device according to claim 1 wherein the lightguide unit comprises a lightguide.

6. An optical position detection device according to claim 5 wherein the lightguide comprises at least one flexible optical fiber.

7. An optical position detection device according to claim 5 wherein the lightguide comprises a rigid lightguiding material.

8. An optical position detection device according to claim 5 wherein the lightguide is arranged in a housing having first and second windows through which the beam enters and leaves the lightguide.

9. An optical position detection device according to claim 1 including an evaluation unit operatively coupled to the receiver.

10. An optical position detection device according to claim 1 wherein the sending and receiving unit comprises a position and/or safety switch.

11. An optical position detection device according to claim 1 wherein the sending and receiving unit is connected to a machine housing and the lightguide unit is connected to a protective device that is movable relative to the machine housing.

12. An optical position detection device according to claim 11 wherein the protective device comprises a protective door.

13. An optical position detection device comprising an optical sending and receiving unit which includes a sender with associated transmission optics for emitting a radiation beam and a receiver arranged at a given distance from the sender and having associated reception optics for receiving the radiation beam, and an optical lightguide unit for directing the beam from the sender to the receiver, wherein the units can move relative to each other and are configured so that, when they are at the given distance relative to each other, the light beam emitted by the sender is guided to the reception optics, the transmission optics and the reception optics being arranged so that respective axes of the beam emitted by the sender and received by the receiver are angularly inclined with respect to each other by about 90 degrees, wherein the sending and receiving unit is connected to a machine housing and the lightguide unit is connected to a protective device comprising a protective door that is movable relative to the machine housing.

14. An optical position detection device according to claim 13 wherein the lightguide unit comprises first, second and third mirrors, each of which deflects the beam by about 90 degrees.

15. An optical position detection device according to claim 14 wherein the first, second and third mirrors are arranged in a common housing which includes windows through which the beam passes before it leaves and enters the common housing.

\* \* \* \* \*